(12) United States Patent
Boyko et al.

(10) Patent No.: US 9,928,273 B2
(45) Date of Patent: Mar. 27, 2018

(54) ENHANCED DATABASE SEARCHING AND STORAGE

(71) Applicant: International Business Machines Corporation, Armonk, NY (US)

(72) Inventors: Adrian M. Boyko, Tucson, AZ (US); William J. Oliver, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/970,064

(22) Filed: Aug. 19, 2013

(65) Prior Publication Data

US 2015/0052161 A1 Feb. 19, 2015

(51) Int. Cl.
| G06F 17/00 | (2006.01) |
| G06F 17/30 | (2006.01) |
| G06F 17/21 | (2006.01) |
| G06K 9/22 | (2006.01) |
| G06F 17/22 | (2006.01) |

(52) U.S. Cl.
CPC ........ G06F 17/30424 (2013.01); G06F 17/21 (2013.01); G06F 17/214 (2013.01); G06F 17/2217 (2013.01); G06F 17/2276 (2013.01); G06F 17/2282 (2013.01); G06K 9/228 (2013.01)

(58) Field of Classification Search
CPC .... G06F 17/21; G06F 17/214; G06F 17/2217; G06F 17/2276; G06F 17/2282; G06F 17/30424; G06K 9/228
USPC ........ 715/234, 255–257, 259, 271; 707/756; 382/309–310, 321–323
See application file for complete search history.

(56) References Cited

U.S. PATENT DOCUMENTS

| 1,261,167 | A | | 4/1918 | Russell |
| 6,018,735 | A | * | 1/2000 | Hunter ............. G06F 17/30985 |
| 6,023,536 | A | * | 2/2000 | Visser ........................... 382/310 |
| 6,205,261 | B1 | * | 3/2001 | Goldberg ................. G06K 9/03 382/187 |
| 6,553,131 | B1 | | 4/2003 | Neubauer et al. |
| 9,292,759 | B2 | * | 3/2016 | Burry .................... G06K 9/3258 |
| 2008/0118110 | A1 | * | 5/2008 | Simonsson ............ G06K 9/033 382/104 |

(Continued)

FOREIGN PATENT DOCUMENTS

| JP | 61-131089 A | 6/1986 |
| WO | 2008/018287 A1 | 2/2008 |
| WO | 2008/099664 A1 | 8/2008 |

OTHER PUBLICATIONS

Ivan Dervisevic, "Machine Learning Methods for Optical Character Recognition", Dec. 18, 2006, pp. 25.*

(Continued)

*Primary Examiner* — Chau Nguyen
(74) *Attorney, Agent, or Firm* — Edward J. Wixted, III

(57) ABSTRACT

In a method for searching a computer database, a processor receives a set of data containing at least a first character. A processor creates a converted set of data by converting the first character in the received set of data into a second character, wherein the second character represents the first character and one or more additional characters based upon a predetermined equivalency. A processor searches the computer database for a previously stored data entry using the converted set of data. A processor returns a retrieved result of the searching.

19 Claims, 5 Drawing Sheets

(56) References Cited

U.S. PATENT DOCUMENTS

| | | | |
|---|---|---|---|
| 2008/0285804 A1* | 11/2008 | Sefton | G06K 9/00771 |
| | | | 382/105 |
| 2012/0063687 A1* | 3/2012 | Sun | G06K 9/6224 |
| | | | 382/203 |
| 2012/0102002 A1* | 4/2012 | Sathyanarayana et al. | 707/687 |
| 2012/0155712 A1 | 6/2012 | Paul et al. | |
| 2012/0287278 A1 | 11/2012 | Danis | |
| 2012/0330947 A1 | 12/2012 | Huenemann et al. | |
| 2013/0004076 A1* | 1/2013 | Koo | G06K 9/228 |
| | | | 382/176 |
| 2013/0216101 A1* | 8/2013 | Wu et al. | 382/105 |
| 2013/0259314 A1* | 10/2013 | Kozitsky | G06K 9/3258 |
| | | | 382/105 |

OTHER PUBLICATIONS

"Solution Brief—Automatic License Plate Recognition", 2012, Motorola Solutions, Inc. pp. 4.*
Pan Xiang et al., "A Hybrid Method for Robust Car Plate Character Recognition," 2004 IEEE International Conference on Systems, Man and Cybernetics, IEEE, pp. 4733-4737, 2004.
Carmen ANPR Engine: "Automatic License Plate Recognition, Automatic No. Plate Recognition", http://www.anpr.net/.
cVISION: "OCR, PDF Compression", http://cvisiontech.com.

* cited by examiner

| SOURCE CHARACTER (OCR) | STRING REPLACEMENT |
|---|---|
| 0, O, Q, D | Q |
| G, 6 | G |
| B, 8, R | B |
| 2, Z | 2 |
| 3, J | 3 |

FIG. 4

ENHANCED DATABASE SEARCHING AND STORAGE

FIELD OF THE INVENTION

The present invention relates generally to the field of computer database searching and storage and more particularly to searching and storing character strings based upon errors in recognition or input of data.

BACKGROUND OF THE INVENTION

Optical character recognition (OCR) is the conversion of handwritten, typewritten or printed text into machine-encoded text. Analyzed images are often pre-processed to improve the chances of successful character recognition. Pre-processing techniques include adjusting character alignment, smoothing character edges, converting images to black-and-white, and other methods.

Automatic license plate readers (ALPRs) use OCR technology on images to read vehicle license plates. ALPRs are used by law enforcement officials to perform a variety of tasks. ALPRs can assist law enforcement officials in finding stolen vehicles, ticketing traffic violations, or locating drivers with suspended licenses or no insurance. ALPRs may connect to police databases to compare gathered license plate information with license plate information contained on the databases. Police databases may include license plate information corresponding to a variety of previously committed crimes, and ongoing investigations. Oftentimes information contained in these databases may be gathered by eyewitness reports, ALPRs, or other sources.

SUMMARY

Aspects of an embodiment of the present invention disclose a method, computer program product, and computing system for searching a computer database. A processor receives a set of data containing at least a first character. A processor creates a converted set of data by converting the first character in the received set of data into a second character, wherein the second character represents the first character and one or more additional characters based upon a predetermined equivalency. A processor searches the computer database for a previously stored data entry using the converted set of data. A processor returns a retrieved result of the searching.

BRIEF DESCRIPTION OF THE SEVERAL VIEWS OF THE DRAWINGS

FIG. 4 is an exemplary list of stored string replacement rules accessible to a search enhancement server program executing within the computing system of FIG. 1, in accordance with one embodiment of the present invention.

DETAILED DESCRIPTION

Figure 1:
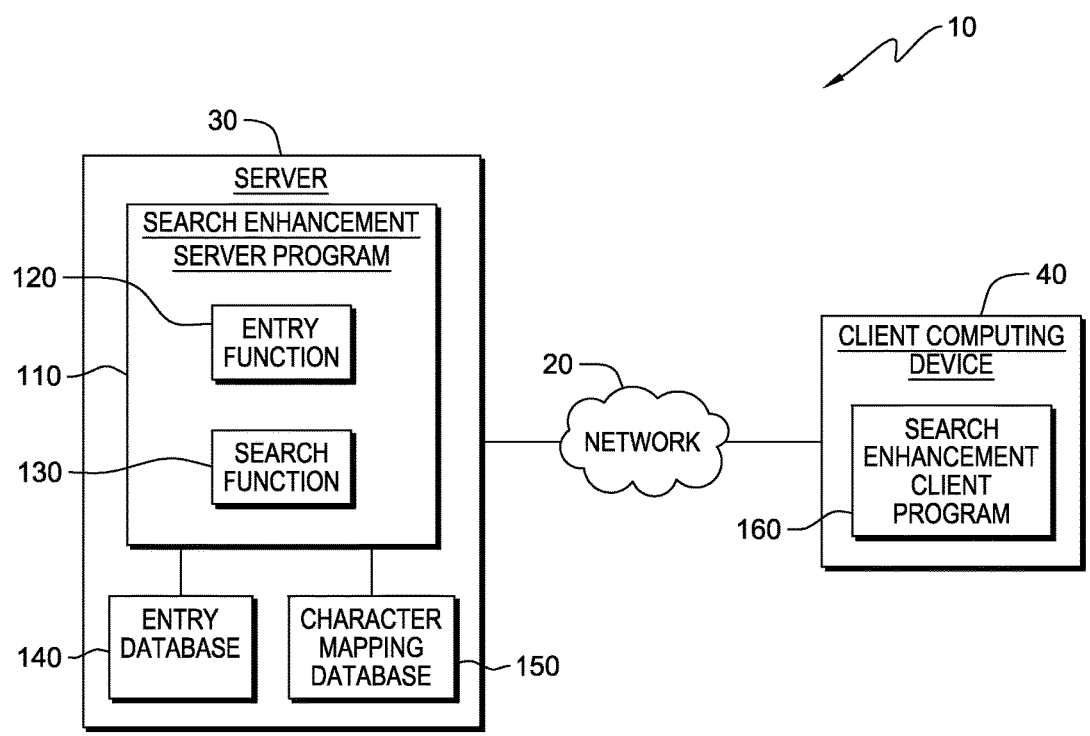
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts a diagram of computing system 10 in accordance with one embodiment of the present invention. FIG. 1 provides an illustration of one embodiment and does not imply any limitations with regards to the environments in which different embodiments may be implemented.

In the depicted embodiment, computing system 10 includes server 30 and client computing device 40 interconnected over network 20. Network 20 may be a local area network (LAN), a wide area network (WAN) such as the Internet, a cellular data network, any combination thereof, or any combination of connections and protocols that will support communications between server 30 and client computing device 40 in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of receiving and sending data. In some embodiments, server 30 may be a laptop computer, tablet computer, netbook computer, personal computer, a desktop computer, a personal digital assistant (PDA), a smart phone, or any programmable electronic device capable of communicating with client computing device 40 via network 20. In other embodiments, server 30 may represent a server computing system utilizing multiple computers as a server system, such as in a cloud computing environment.

Server 30 contains search enhancement server program 110, entry function 120, search function 130, entry database 140, and character mapping database 150. Server 30 may include components, as depicted and described in further detail with respect to FIG. 5.

Client computing device 40 may be a desktop computer, laptop computer, netbook computer, tablet computer, personal digital assistant (PDA), or smart phone. In general, client computer 40 may be any electronic device or computing system capable of sending and receiving data, and communicating with server 30 over network 20. Client computing device 40 contains search enhancement client program 160. Client computing device 40 may include components, as depicted and described in further detail with respect to FIG. 5. In exemplary embodiments, client computing device 40 may operably communicate with one or more optical character recognition (OCR) devices, such as automatic license plate readers (ALPRs).

Search enhancement client program 160 may be a dedicated client database program, a function integrated within another program, or any other program or function that can communicate with search enhancement server program 110, entry function 120, and search function 130 and provide a user interface for inputting data entries, searching a database, such as entry database 140, and viewing search results from such a database. Specific data entries may vary, but may include names, words, character strings, or other types of data. In an exemplary embodiment, data entries will include license plate numbers.

Search enhancement server program 110 operates to store data entries and allow for a search of data entries stored in a database. In one embodiment, search enhancement server program 110 may convert source information contained within each data entry or search request into a different form, such as a string replacement form that allows for enhanced searchability based upon a predetermined equivalency. A predetermined equivalency may be, for example, a set of characters that are optically similar, common typographical errors, or other factors. A string replacement form of a data entry may narrow the scope of characters used, such as alphanumeric characters, to create the character string based upon a predetermined equivalency. Optically similar characters are characters such as numbers, uppercase letters, lowercase letters, and other symbols that may appear similar to the human eye or optical character recognition (OCR) techniques. For example, the characters "0," "O," "o," "Q," and "D" may be considered optically similar characters. In another embodiment, search enhancement server program 110 may convert information contained within each data entry or search request into a different form that allows for enhanced searchability based upon predetermined equivalencies based on common typographical errors on a QWERTY, or other style keyboard. In one embodiment, search enhancement server program 110 includes two functions: entry function 120 and search function 130. In one embodiment, search enhancement server program 110 resides on server 30. In other embodiments, search enhancement server program 110 may reside on another server, another computing device, or client computing device 40, provided that search enhancement server program 110 is accessible to search enhancement client program 160, and provided that search enhancement server program 110 has access to entry database 140 and character mapping database 150.

Entry function 120 operates to store data entries to entry database 140. Entry function 120 may convert source characters in a data entry into string replacement characters, according to a predetermined equivalency. The predetermined equivalency may be based on a set of rules stored to character mapping database 150. In some embodiments, entry function 120 may store the string replacement form as additional data with the data entry.

Search function 130 operates to search data entries stored to entry database 140 by their string replacement character form. In one embodiment, search function 130 converts entered search request information into string replacement characters and searches a database, such as entry database 140 by string replacement character form. Search function 130 may then return and display the search results in data entry source character form.

Character mapping database 150 is a repository that may be written and read by search enhancement server program 110. String replacement rules may be stored to character mapping database 150. In one embodiment, string replacement rules may be based upon predetermined equivalencies about character optical similarity, such as B and 3. In this example, both B and 3 may be represented as the string replacement character B. In other embodiments, source character to string replacement rules may be based upon predetermined equivalencies between commonly mistyped characters. In some embodiments, character mapping database 150 may have multiple sets of rules that are applied based upon the source of the data entry. For example, character mapping database 150 may have a set of rules for data input by a human and a second set of rules for data collected by OCR techniques. In one embodiment, character mapping database 150 resides on server 30. In other embodiments, character mapping database may reside on another server, another computing device, or client computing device 40, provided that character mapping database 150 is accessible to search enhancement server program 110, entry function 120, and search function 130.

Entry database 140 is a repository that may be written and read by search enhancement server program 110. Data entries may be stored to entry database 140. Data entries may include names, words, license plates, identification numbers, or any other type of data. In some embodiments, data entries may include data in both source character and string replacement form. In one embodiment, entry database 140 resides on server 30. In other embodiments, entry database 140 may reside on another server, another computing device, or client computing device 40, provided that entry database 140 is accessible to search enhancement server program 110, entry function 120, and search function 130.

Figure 2:
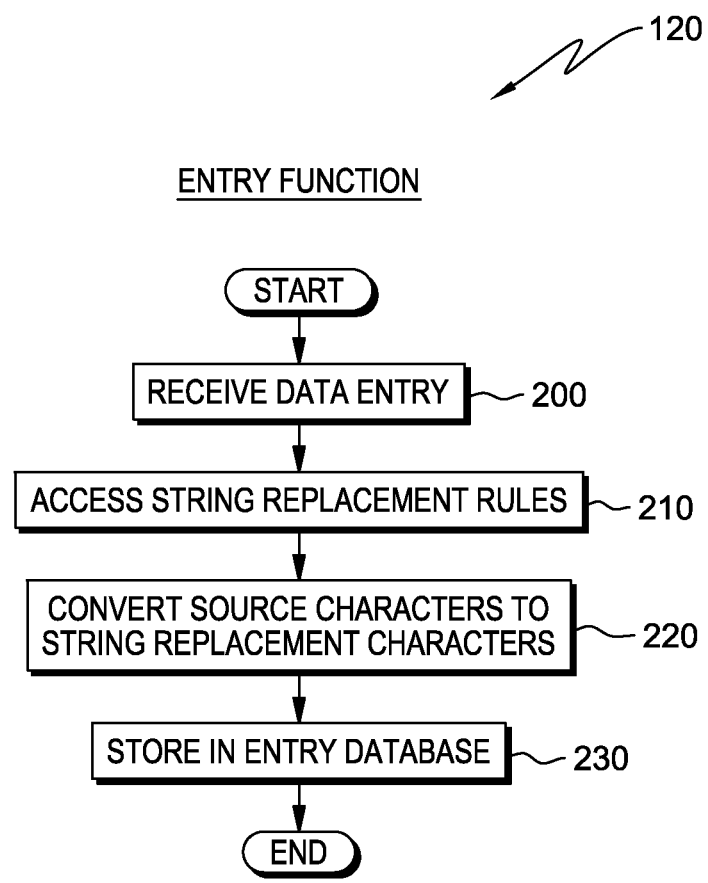
FIG. 2 depicts a flowchart of the steps of a search enhancement server program executing an entry function within the computing system of FIG. 1, for storing data entries to a database in accordance with one embodiment of the present invention.

FIG. 2 depicts a flowchart of the steps of entry function 120, a function of search enhancement server program 110, executing within the computing system of FIG. 1. Entry function 120 adds data entries to entry database 140 in both a source form composed of the source characters and a string replacement form composed of data entry source characters converted into string replacement characters according to predetermined equivalencies, in accordance with one embodiment of the present invention.

In one embodiment, a user at client computing device 40 composes a data entry, using search enhancement client program 160. In another embodiment, an optical character recognition (OCR) device such as an automatic license plate reader (ALPR) may compose and submit the data entry to search enhancement client program 160 using gathered images that contain text or other characters. A data entry may include any type of data entry containing words or strings of characters. For example, in a law enforcement license plate database, a data entry may include crimes linked to a license plate number, registration status, primary driver status, license plate number, registration number, and/or the make, model and year of the automobile. Once the data entry is received, search enhancement client program 160 sends the data entry to search enhancement server program 110.

In an exemplary embodiment, a user at client computing device 40 may have the option to store a data entry along with an indication that the information contained in the source characters of the entry is precise. Typically, the indication that the information is precise will come from the user entering the information in the data entry. In some embodiments, there may be a selection box that, when selected, will cause the indication that the information is precise to be made. As an example, data entry information gathered by the use of an OCR device may contain errors due to optical similarities between characters while a manual entry by a police officer indicating the license plate of a stolen vehicle may not contain similar errors. The police officer may select an option to indicate that the manually entered data entry is precise. Indicating which entries in entry database 140 contain precise source characters may enhance the reliability of a search for information within the database.

In step 200, entry function 120 receives a data entry from search enhancement client program 160. In one embodiment, search enhancement client program 160 sends new data entries across network 20 to entry function 120. In another embodiment, entry function 120 retrieves data entries from search enhancement client program 160 through search enhancement server program 110.

In step 210, entry function 120 accesses one or more string replacement rules from character mapping database 150. In some embodiments, the one or more string replacement rules may be a set of default rules based upon a predetermined equivalency. In other embodiments, the one or more string replacement rules may be a customized set of string replacement rules created by the user for inputting data entries into the particular database. The one or more string replacement rules may be based on a predetermined equivalency, such as characters that appear optically similar, common typos on a QWERTY keyboard, or other factors.

String replacement rules are rules used by entry function 120 and search function 130 to convert source characters in a data entry into corresponding string replacement characters according to a predetermined equivalency. String replacement rules convert an entry that is in source character form into its corresponding string replacement form. String replacement rules may assist in returning enhanced search results for a response to a search inquiry based on imprecise information. String replacement rules may be created to account for recognition or input errors due to predetermined equivalencies such as character optical similarity (e.g., "0," "O," "o," "Q," "D"; or "5," "S"), typographical errors (e.g., "c" may be mistyped on a QWERTY keyboard as "x," "s," "d," "f," or "v"), or based on other potential issues with character input. For example, to account for optical similarity, string replacement rules may dictate that the source characters "2" and "Z" are both represented by the string character "2." Alternatively, string replacement rules may dictate that the source characters "2" and "Z" are both represented by the string character "@." An exemplary set of string replacement rules with regards to optical similarity between characters is shown by FIG. 4.

String replacement rules can be customized by a user and may enable search enhancement server program 110 to deliver more expansive, yet relevant, search results based upon the circumstances. In one embodiment, there may be multiple sets of string replacement rules based upon factors like the source of input of the data entry or the search inquiry. There may be multiple sets of string replacement rules based upon the source of the input because, for example, characters that frequently appear optically similar to the human eye may be different than characters that frequently are incorrectly identified by an OCR device, so two different sets of string replacement rules may exist.

In some embodiments, one or more sets of default string replacement rules may be present. In other embodiments, prior to inputting a data entry with entry function 120, a user at client computing device 40 may establish a predetermined equivalency by composing one or more sets of string replacement rules, using search enhancement client program 160. Search enhancement client program 160 may send the one or more sets of string replacement rules to search enhancement server program 110. Search enhancement server program 110 may store the one or more sets of string replacement rules to character mapping database 150.

In step 220, entry function 120 converts data entries in source character form into string replacement form by converting source characters contained within the data entry into string replacement characters, according to the applicable predetermined equivalency. The predetermined equivalency may be established by one or more string replacement rules. In order to process the conversion, entry function 120 looks to each character contained within the data entry and compares each individual character to its applicable string replacement rule. If the character has an applicable string replacement rule, the character is converted into a string replacement character. If one or more characters are not associated with any string replacement rules, the converted version of the one or more unassociated characters may be the original character itself.

In some embodiments, OCR devices may input multiple potential characters the represent a single character displayed on an image. For example, an OCR device may return [G6], [6OO], or [XZ]. An exemplary embodiment of the present invention may replace such returned groups of characters with a single string replacement character. In order to replace a returned group of characters with a single character, entry function 120 may translate each source character in the group individually, based on string replacement character rules. If all characters in the group are the same after the conversion, or there is a clear character majority within the group (i.e., in the case of converted group [G00], 0 would be the majority and G would be the minority), duplicate, or minority characters will be expunged from the group. If there is no majority due to equal numbers of characters, one or both may be selected. In another embodiment, rather than expunging minority characters, both variations may be stored.

After converting all source character form data entries into string replacement character form according to applicable predetermined equivalencies, entry function 120 stores the data entry information to entry database 140 (step 230) for access by search enhancement server program 110 and search function 130. In an exemplary embodiment, the converted entry information will be stored with data entry information as received, i.e., source character form data entries.

Figure 3:
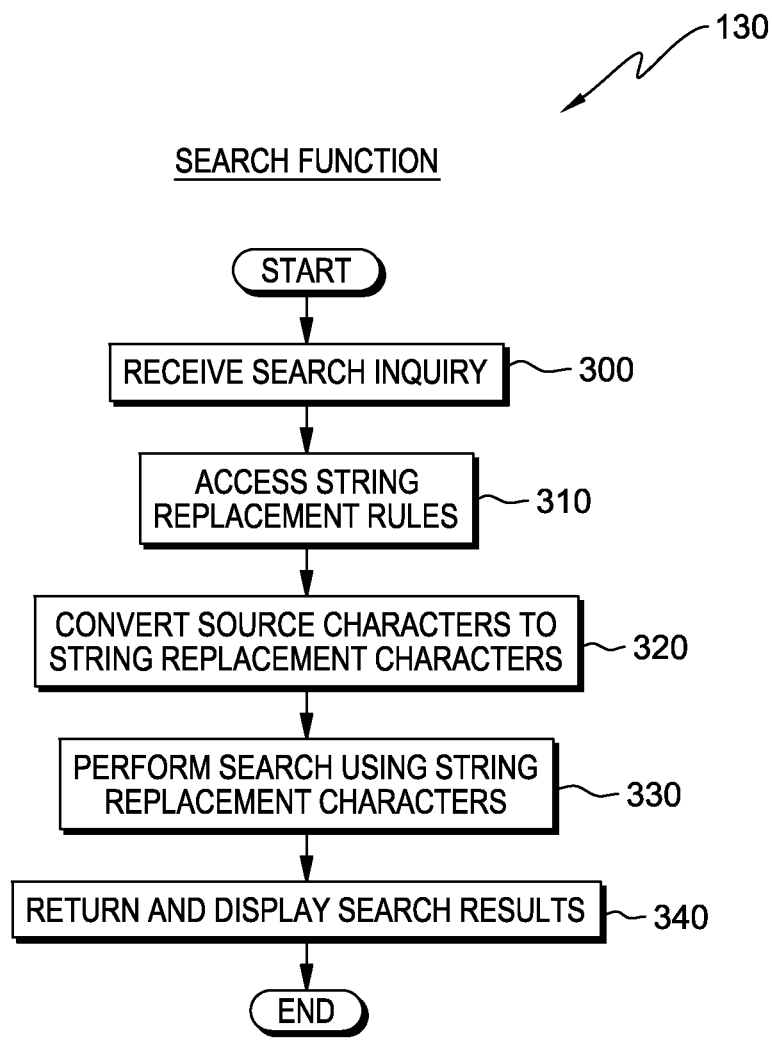
FIG. 3 depicts a flowchart of the steps of a search enhancement server program executing a search function within the computing system of FIG. 1, for performing search inquiries of a database in accordance with one embodiment of the present invention.

FIG. 3 depicts a flowchart of the steps of search function 130, a function of search enhancement server program 110, executing within the computing system of FIG. 1. Search function 120 searches data entries stored to entry database 140 using the data entry's string replacement form and returns search results, in accordance with one embodiment of the present invention.

In one embodiment, a user at client computing device 40 composes a search inquiry, using search enhancement client program 160. In another embodiment, an optical character recognition (OCR) device such as an automatic license plate reader (ALPR) may compose and submit a search inquiry to search enhancement client program 160 using gathered images that contain text or other characters. A search inquiry may include a search for any type of information contained in the database being searched. For example, in a law enforcement license plate database, a search inquiry might include a search for a licensed driver, stolen vehicle, license plate number, registration number, and/or the make, model and year of an automobile. After receiving the search inquiry, search enhancement client program 160 sends the search inquiry to search enhancement server program 110.

In an exemplary embodiment, the user interface of search enhancement client program 160 may provide the option to search according to source character information (i.e., the actual characters typed or input), or search according to string replacement character information. String replacement character information is created through the application of string replacement rules to source character information. Typically, the string replacement rules are created to take into account a predetermined equivalency between multiple characters. An embodiment of search enhancement client program 160 may provide multiple options with regards to searching according to string replacement character information. For example, a user may be able to search based on predetermined equivalencies caused by common typographical errors or between optically similar characters. For example, a user may be initiating a search request based upon information obtained from an eyewitness account of a crime. The eyewitness to the crime may specify a street sign they saw, license plate they read, or some other word or string of characters that they noticed. Searching based upon string replacement character information that takes into account optically similar characters may help address errors in recollection made by the eyewitness.

In step 300, search function 130 receives a search inquiry from search enhancement client program 160. As previously discussed, the search inquiry may have been input to client program 160 by a user at client computing device 40. Alternatively, an OCR device may capture text or other characters from an image to create the search inquiry. Search function 130 may receive a search inquiry from search enhancement client program 160. Alternatively, search function 130 may monitor and retrieve search inquiries from search enhancement client program 160.

In step 310, search function 130 accesses one or more string replacement rules from character mapping database 150. In some embodiments, the one or more string replacement rules may be a set of default rules based upon a predetermined equivalency between characters. In other embodiments, the one or more string replacement rules may have been a customized set of string replacement rules originally created by the user when inputting data entries into the particular database. As previously discussed, the one or more string replacement rules may contain multiple sets of string replacement rules, each set of rules dependent upon the source of the data entry (e.g., OCR, manual input, etc).

String replacement rules are rules used by entry function 120 and search function 130 to convert source characters contained within a data entry into string replacement characters. String replacement rules are created to assist in returning enhanced results when searching a database based on imprecise information. String replacement rules may be created to account for input errors due to predetermined equivalencies between characters such as optical similarities (e.g., 0, O, Q, D; or 5, S), potential typographical errors (e.g., "c" mistyped on a QWERTY keyboard as "x," "s," "d," "f," or "v"), or based on other sensory recognition or input errors. For example, to account for the predetermined equivalency of optical similarity, string replacement rules may dictate that the characters "2" and "Z" are both converted to the string character "2" when the data entry is read in its string character form. An exemplary set of string replacement rules with regards to optical similarity between characters will be discussed with regards to FIG. 4.

In step 320, search function 130 converts source character information contained within the search inquiry into string replacement characters, according to the one or more string replacement rules. In order to process the conversion, search function 130 looks to each character contained within the search inquiry and compares the character to the applicable string replacement rule. If the character has an applicable string replacement rule, the character is converted into a string replacement character. If one or more characters are not associated with any string replacement rules, the converted version of the one or more unassociated characters may be the original character itself. If there are groups of characters representing a single character, such as a group returned by an OCR device, the group of characters may be narrowed to a single string replacement character according to the method discussed in FIG. 2.

After converting the search inquiry source character information into string replacement character form, search function 130 performs a search of entry database 140 using the converted string replacement characters as the search term(s) (step 330). By searching based upon converted string replacement characters, the search results may provide information that takes into account predetermined equivalencies such as typographical errors, optical similarities of the characters, or other potential search errors, based on the settings selected and the database(s) searched.

After performing the search (see step 330), search function 130 returns and displays the results of the search on client computing device 40 (step 340). In one embodiment, search results will be displayed in source character form, and may indicate the predetermined equivalency or the set of string replacement rules used to return the search result (e.g., optically similar characters, common typographical errors, etc.).

To illustrate how search function 130 can affect search results, consider two possible stored source character strings: "QBZ123" and "ORZ123." FIG. 4 depicts a set of string replacement rules based upon the predetermined equivalency of optical similarity between characters. Using the exemplary set of string replacement rules of FIG. 4, the string replacement character form of both source character strings would be identical and would be "QB2123." Similarly, when the source character string "D821Z3" is converted into string replacement character form according to the exemplary set of string replacement rules of FIG. 4, the resulting form is "QB2123." As such, a search inquiry by a user at client computing device 40, using search enhancement client program 160 for D821Z3 may return results that include both QBZ123 and ORZ123. Such results may account for errors in the search inquiry due to optical character similarity.

FIG. 4 is an exemplary list of stored string replacement rules in accordance with one embodiment of the present invention. String replacement rules may be created to account for search errors resulting from predetermined equivalencies such as typographical errors, optical similarity between characters, or other factors. String replacement rules may vary based upon data input method. For example, an OCR device may frequently read characters on an image incorrectly, while the same image containing the same characters might be easily recognizable by a human. The depicted exemplary list of stored string replacement rules contains a list of rules applicable to an OCR device to adjust search inquiries and data entries based upon the optical similarity of characters. A separate list of stored string replacement rules (not shown) may contain a list of rules applicable to data entered manually by a user at client computing device 40 using search enhancement client program 160. Entry function 120 and search function 130 may determine which list of stored string replacement rules to apply by monitoring the input source through search enhancement client program 160.

Exemplary list of stored string replacement rules 400 contains source character column heading 410, string replacement column heading 420, string replacement rules rows 430, and string replacement rule row 440. Exemplary list of stored string replacement rules 400 is stored to character mapping database 150. Source character column heading 410 indicates that the source characters in the rows below the heading are source characters. Source character column heading 410 also indicates that in this particular embodiment the source character information's origin is from an OCR device. String replacement column heading 420 indicates that string replacement characters, for corresponding source characters, are listed below. Rows 430 contain source characters and their corresponding string replacement. In the current depiction, source characters "0," "O," "Q," and "D" are represented by the string replacement Q. Source characters in the additionally presented rows are represented by their corresponding string replacement in a similar manner.

Row 440 contains an example of a possible OCR-specific string replacement rule. Row 440 contains the source characters "3" and "J," and designates a string replacement character of "3." In some instances, the characters "3" and "J" have been found to be optically similar for OCR devices, such as ALPRs. However, rarely are the characters "3" and "J" considered to be optically similar when viewed by the human eye. Therefore, in some embodiments, a string replacement rule that converts "3" and "J" into the string replacement "3" will only occur when the data entry or search inquire input comes from an OCR device.

A database program, such as search enhancement server program 110, entry function 120, or search function 130 of FIG. 1, may use exemplary list of stored string replacement rules 400 and its associated string replacement rules to store information to a database, such as entry database 140, and to perform and generate search results of such a database.

One of skill in the art will recognize that different discrepancies between different sources may arise, and observed discrepancies and identification errors may help a user customize and define string replacement rules. Furthermore, while discussed string replacement characters have all comprised one of the characters that coincide with a source character, additional characters or strings of characters may be used to represent the combination of source characters. For example, FIG. 4 depicts the source characters "3" and "J" both having a string replacement "3." This may provide issues if a separate list of stored string replacement rules does not have such a rule and maps the source character "3" and the string replacement "3" and the source character "J" as the string replacement "J." To combat this problem, string replacements may be represented by a character string, such as "^J," or alternatively, may be represented by additional characters outside of the alphanumeric range.

Figure 5:
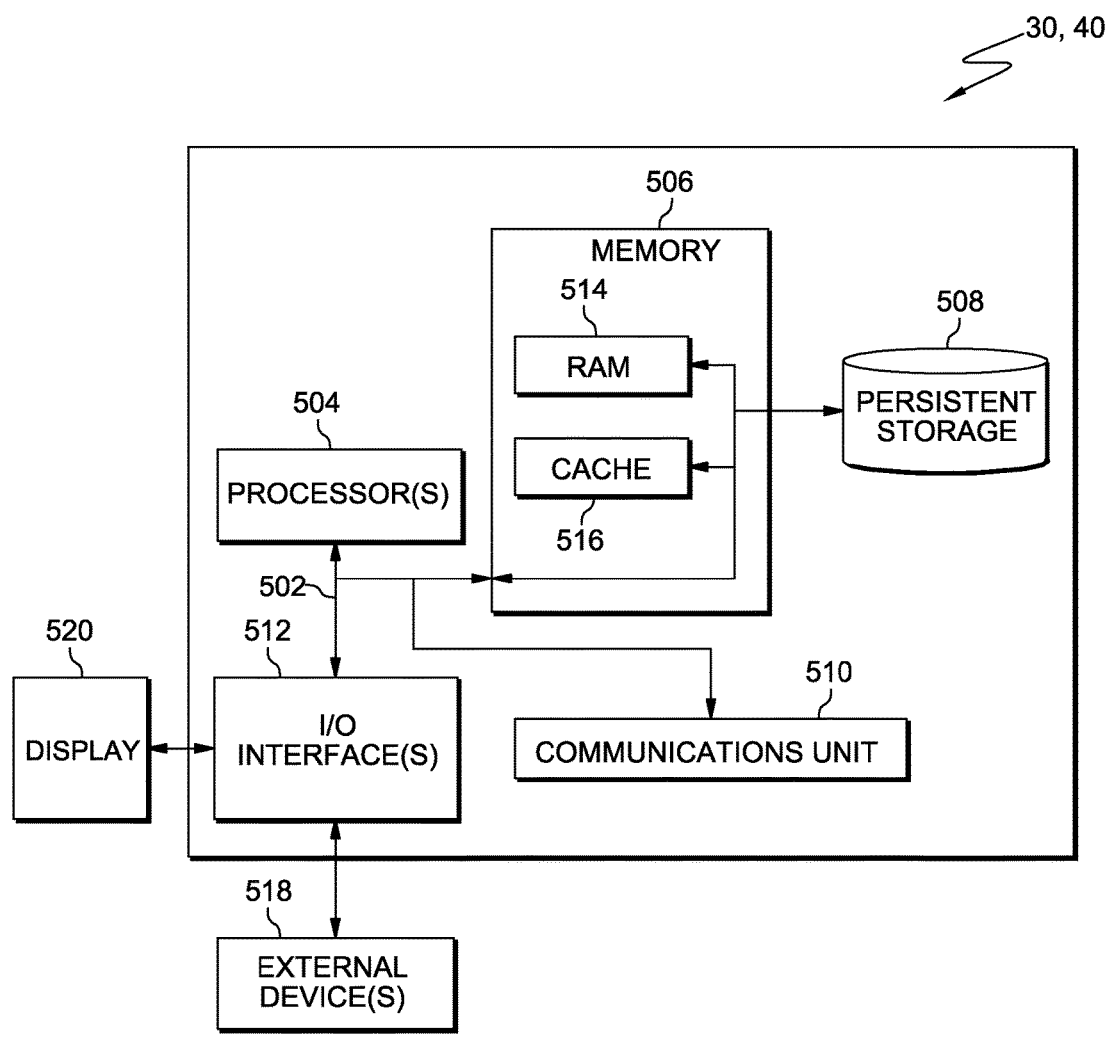
FIG. 5 depicts a block diagram of components of the server and the client computing device of FIG. 1 in accordance with one embodiment of the present invention.

FIG. 5 depicts a block diagram of components of server 30 and/or client computing device 40 in accordance with one embodiment of the present invention. It should be appreciated that FIG. 5 provides only an illustration of one implementation and does not imply any limitations with regard to the environments in which different embodiments may be implemented. Many modifications to the depicted environment may be made.

Server 30 and client computing device 40 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Search enhancement server program 110, entry function 120, search function 130, entry database 140, and character mapping database 150 are stored in persistent storage 508 of server 30 for execution and/or access by one or more of the respective computer processors 504 of server 30 via one or more memories of memory 506 of server 30. Search enhancement client program 160 is stored in persistent 508 of client computing device 40 for execution by one or more of the respective computer processors 504 of client computing device 40 via one or more memories of memory 506 of client computing device 40. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Search enhancement server program 110, entry function 120, search function 130, entry database 140, and character mapping database 150 may be downloaded to persistent storage 508 of server 30 through communication unit 510 of server 30. Search enhancement client program 160 may be downloaded to persistent storage 508 of client computing device 40 through communication unit 510 of client computing device 40.

I/O interface(s) 512 allows for input and output of data with other devices that may be connected to computing system 10. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., search enhancement server program 110, entry function 120, search function 130, entry database 140 and character mapping database 150, can be stored on such portable computer-readable storage media and can be loaded onto persistent storage 508 of server 30 via I/O interface(s) 512 of server 30. Software and data used to practice embodiments of the present invention, e.g., search enhancement client program 160, can be stored on such portable computer-readable storage media and can be loaded onto persistent storage 508 of client computing device 40 via I/O interface(s) 512 of client computing device 40. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for searching a computer database, the method comprising:
    receiving, by one or more processors, a search inquiry comprising a set of data containing at least a first character;
    determining, by one or more processors, that the first character in the received set of data is a member of a group of characters that are grouped based upon a predetermined equivalency;
    creating, by one or more processors, a converted set of data for the search inquiry by converting the first character in the received set of data into a second character, wherein the second character is a single character that is a representation equivalent to any one character of the group of characters including the first character and one or more additional characters;

searching, by one or more processors, the computer database for a previously stored data entry using the converted set of data wherein:
the previously stored data entry includes a data entry source character form and a converted form;
the converted form of the previously stored data entry includes the second character; and
the search comprises matching the converted set of data with the converted form of the previously stored data entry; and returning, by one or more processors, a retrieved result of the searching, wherein the retrieved result comprises the data entry source character form of the previously stored data entry.

2. The method of claim 1, wherein the step of creating the converted set of data for the search inquiry by converting the first character in the received set of data into the second character comprises:
receiving information identifying a source of input of the received set of data;
selecting a set of one or more rules based upon the received information identifying the source of input of the received set of data; and
converting the first character in the received set of data into the second character, according to the set of one or more rules.

3. The method of claim 1, wherein the predetermined equivalency is based upon optical similarity of characters.

4. The method of claim 1, wherein the set of data is received from images captured by an optical character recognition (OCR) device.

5. The method of claim 4, wherein the OCR device is an automatic license plate recognition (ALPR) device.

6. A computer program product for searching a computer database, the computer program product comprising:
one or more computer-readable hardware storage media and program instructions stored on the one or more computer-readable hardware storage media, the program instructions comprising:
program instructions to receive a search inquiry comprising a set of data containing at least a first character;
program instructions to determine that the first character in the received set of data is a member of a group of characters that are grouped based upon a predetermined equivalency;
program instructions to create a converted set of data for the search inquiry by converting the first character in the received set of data into a second character, wherein the second character is a single character that is a representation equivalent to any one character of the group of characters including the first character and one or more additional characters;
program instructions to search the computer database for a previously stored data entry using the converted set of data wherein:
the previously stored data entry includes a data entry source character form and a converted form;
the converted form of the previously stored data entry includes the second character; and
the search comprises matching the converted set of data with the converted form of the previously stored data entry; and program instructions to return a retrieved result of the searching, wherein the retrieved result comprises the data entry source character form of the previously stored data entry.

7. The computer program product of claim 6, wherein program instructions to create the converted set of data for the search inquiry by converting the first character in the received set of data into the second character comprise:
program instructions to receive information identifying a source of input of the received set of data;
program instructions to select a set of one or more rules based upon the received information identifying the source of input of the received set of data; and
program instructions to convert the first character in the received set of data into the second character according to the set of one or more rules.

8. The computer program product of claim 6, wherein the predetermined equivalency is based upon optical similarity of characters.

9. The computer program product of claim 6, wherein the predetermined equivalency is based upon common typographical errors on a keyboard.

10. The computer program product of claim 6, wherein the set of data is received from images captured by an optical character recognition (OCR) device.

11. The computer program product of claim 10, wherein the OCR device is an automatic license plate recognition (ALPR) device.

12. The computer program product of claim 6, wherein the set of data is one or more license plate numbers.

13. The computer program product of claim 6, wherein the second character is a unique character that is different than each of the first character and the one or more additional characters.

14. The computer program product of claim 6, wherein:
each character of the first character and the one or more additional characters of the group of characters is a character of an alphanumeric set of characters; and
the second character is a character of an alternate set of characters, wherein the alternate set of characters includes fewer characters than the alphanumeric set of characters.

15. A computer system for searching a computer database, the computer system comprising:
one or more computer processors, one or more computer-readable storage media, and program instructions stored on the computer-readable storage media for execution by at least one of the one or more processors, the program instructions comprising:
program instructions to receive a search inquiry comprising a set of data containing at least a first character;
program instructions to determine that the first character in the received set of data is a member of a group of characters that are grouped based upon a predetermined equivalency;
program instructions to create a converted set of data for the search inquiry by converting the first character in the received set of data into a second character, wherein the second character is a single character that is a representation equivalent to any one character of the group of characters including the first character and one or more additional characters;
program instructions to search the computer database for a previously stored data entry using the converted set of data wherein:
the previously stored data entry includes a data entry source character form and a converted form;

the converted form of the previously stored data entry includes the second character; and the search comprises matching the converted set of data with the converted form of the previously stored data entry; and program instructions to return a retrieved result of the searching, wherein the retrieved result comprises the data entry source character form of the previously stored data entry.

16. The computer system of claim 15, wherein program instructions to create the converted set of data for the search inquiry by converting the first character in the received set of data into the second character comprise:

program instructions to receive information identifying a source of input of the received set of data;

program instructions to select a set of one or more rules based upon the received information identifying the source of input of the received set of data; and program instructions to convert the first character in the received set of data into the second character according to the set of one or more rules.

17. The computer system of claim 15, wherein the predetermined equivalency is based upon optical similarity of characters.

18. The computer system of claim 15, wherein the set of data is received from images captured by an optical character recognition (OCR) device.

19. The computer system of claim 18, wherein the OCR device is an automatic license plate recognition (ALPR) device.

* * * * *